(12) United States Patent
Ray et al.

(10) Patent No.: US 6,431,591 B1
(45) Date of Patent: Aug. 13, 2002

(54) AIRBAG SENSOR DEACTIVATOR SUITABLE FOR USE IN SMART AIRBAG SYSTEM

(75) Inventors: Benjamin D. Ray, Adrian, MI (US); Toby R. Vick, Sylvania, OH (US); Wolfgang Schuett, Clinton, MI (US)

(73) Assignee: Wacker Silicones Corporation, Adrian, MI (US)

( * ) Notice: Subject to any disclaimer, the term of this patent is extended or adjusted under 35 U.S.C. 154(b) by 0 days.

(21) Appl. No.: 09/259,091

(22) Filed: Feb. 26, 1999

(51) Int. Cl.⁷ .............................................. B60R 21/32
(52) U.S. Cl. .................... 280/735; 180/273; 297/217.2; 73/700
(58) Field of Search ................................ 280/734, 735; 73/700, 731, 862.041–862.046; 180/271, 273; 524/863; 297/217.2

(56) References Cited

U.S. PATENT DOCUMENTS

| | | | |
|---|---|---|---|
| 4,794,295 A | * | 12/1988 | Penneck et al. |
| 4,809,244 A | * | 2/1989 | Penneck et al. |
| 4,993,265 A | | 2/1991 | Koen et al. |
| 5,145,933 A | * | 9/1992 | Grisoni et al. |
| 5,357,804 A | * | 10/1994 | Wesemann et al. ........... 73/731 |
| 5,441,560 A | * | 8/1995 | Chiotis et al. |
| 5,532,294 A | * | 7/1996 | Ikeno et al. |
| 5,654,362 A | | 8/1997 | Schulz, Jr. et al. |
| 5,760,116 A | | 6/1998 | Kilgour et al. |
| 5,811,487 A | | 9/1998 | Schulz, Jr. et al. |
| 5,975,568 A | | 11/1999 | Speckhart et al. |
| 5,984,349 A | * | 11/1999 | Van Voorhies ............... 280/735 |
| 6,076,853 A | * | 6/2000 | Stanley ........................ 280/735 |
| 6,089,106 A | * | 7/2000 | Patel et al. .................. 280/735 |
| 6,101,436 A | * | 8/2000 | Fortune et al. .............. 280/735 |

FOREIGN PATENT DOCUMENTS

| | | |
|---|---|---|
| DE | 297 20 363 | 4/1998 |
| WO | WO 98/26961 | 6/1998 |

OTHER PUBLICATIONS

International Search Report—May 22, 2000.

* cited by examiner

Primary Examiner—Brian L. Johnson
Assistant Examiner—Christopher Bottorff
(74) Attorney, Agent, or Firm—Brooks & Kushman P.C.

(57) ABSTRACT

Smart airbag systems employ a sensor bag containing an organopolysiloxane gel pressure transmission medium, transmitting pressure to one or more associated pressure sensor devices. The organopolysiloxane gel efficiently transmits pressure without leaking or extruding from the sensor bag when the latter is punctured or ruptured.

20 Claims, 2 Drawing Sheets

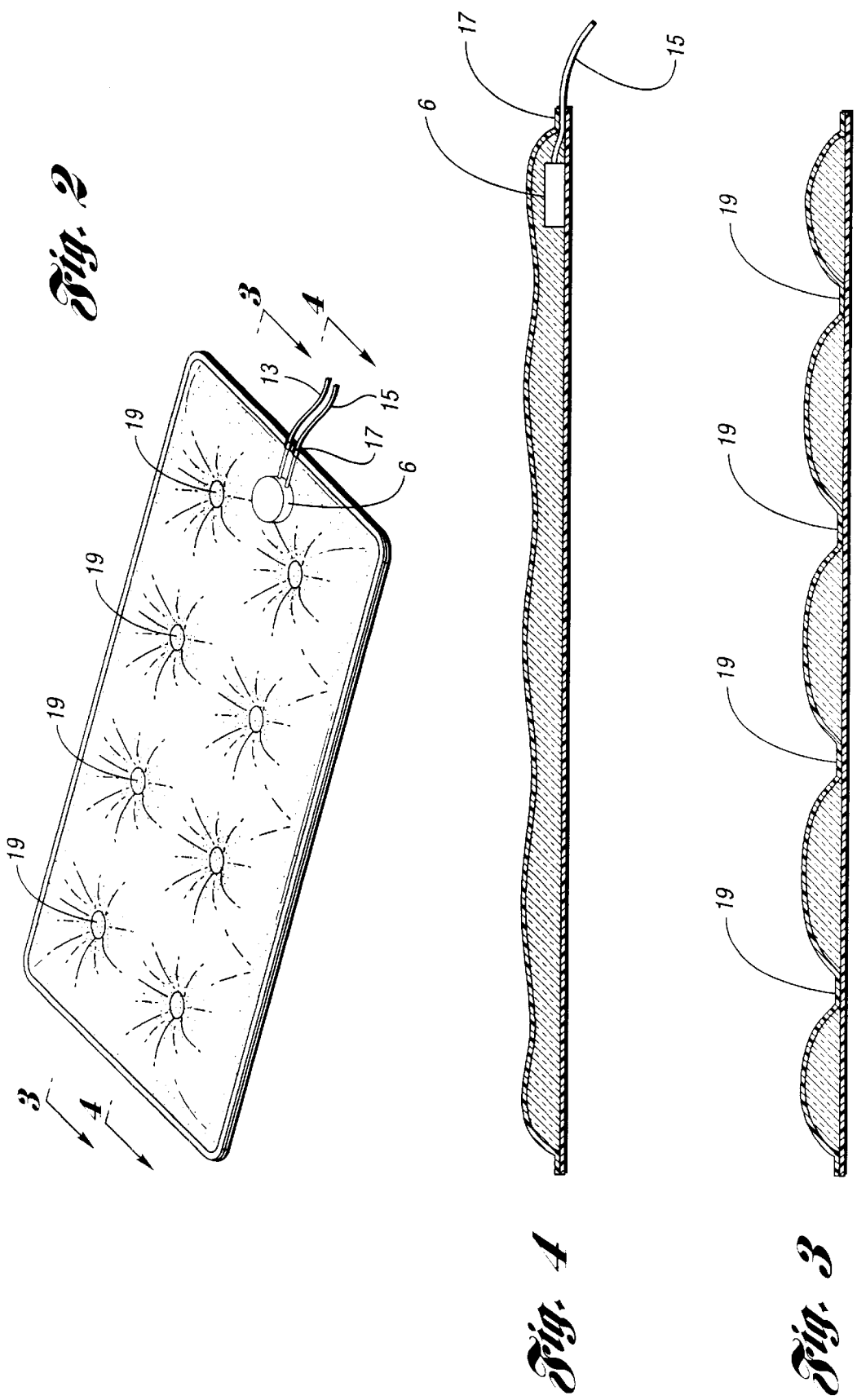

AIRBAG SENSOR DEACTIVATOR SUITABLE FOR USE IN SMART AIRBAG SYSTEM

TECHNOLOGICAL FIELD

The present invention pertains to pressure sensor bags useable in airbag systems used in transportation vehicles and other pressure sensing applications. More particularly, the subject invention pertains to "smart" airbag systems which disarm the airbag when an occupant position in a vehicle is unoccupied, or occupied by an infant.

BACKGROUND ART

Airbags are now in widespread use, and have been mandated as necessary by numerous governments throughout the world. Recently, it has been discovered that airbag systems conventionally employed may cause serious injury and even death to infants and small children. This has caused many manufacturers to offer "cutout" switches to disarm the passenger seat airbag. If the airbag is disarmed while a passenger of normal height and weight is seated, however, the purpose of providing the airbag is compromised, and injury may result in the event of a collision. Accordingly, so-called "smart" airbag systems which can detect the absence of an occupant, or the absence of an occupant of sufficient weight, are being developed.

In "smart" systems, deactivation may be achieved through monitoring the pressure exerted on seating components by means of a pressure sensitive switch or device having equivalent function, which is maintained in or associated with a fluid-containing bladder. The fluid-containing bladder is necessary to transmit forces to the pressure sensitive switch from a large seating area, as the passenger may not necessarily be seated in the same position at all times.

The choice of fluid for the fluid-containing bladder is subject to numerous constraints. Water and many other fluids cannot be used because they either change to the solid state at low temperatures and thus become unable to transmit pressure uniformly through the bladder to the pressure sensitive transducer, or exhibit marked change in viscosity over contemplated use temperatures, resulting in great variation in pressure transmission response characteristics. Some fluids which would otherwise be suitable are chemically reactive, or harmful if ingested. Thus, organopolysiloxane fluids, which have the desirable properties of chemical inertness, low solidification point, low toxicity and substantially constant viscosity/temperature profiles have been proposed as pressure transmitting fluids.

While exhibiting desirable properties as fluid pressure transmission media, silicone fluids exhibit several pronounced drawbacks. If a bladder filled with silicone fluid is punctured or ruptured, either as the result of accidental piercing with a sharp object, or due to a collision, the contents will leak from the bladder. This leakage is more than a minor inconvenience. The silicone fluids are very persistent, and can be removed from foam cushions, trim, etc., with difficulty, if at all. Even more important, the silicone fluids, even in exceptionally minor amounts, cause extreme difficulties in refinishing.

Thus, rupture of a pressure transmitting bladder and loss of fluid may require the entire paintable surface areas of the car to be washed with solvent washes and harsh detergents, often by both hand and machine processes, in order that repair areas from a collision may be successfully repainted. These properties of silicone fluids are well documented, and it is for this reason that components employing silicone fluids are often totally banned from automotive assembly plants.

However, the most important drawback to the use of silicone fluids is that in the case of small punctures, the entire fluid may exit the bag, and the pressure sensor will become inoperative, creating a dangerous situation for the passenger.

It would d be desirable to provide a bladder for an airbag system which exhibits the desirable temperature/viscosity profiles of silicone fluids without exhibiting the problems associated with bladders containing silicone fluids.

DISCLOSURE OF INVENTION

It has now been surprisingly discovered that soft organopolysiloxane gels provide acceptable pressure-transmitting capability while possessing viscosity/temperature profiles suitable for use in smart airbag systems. Because the gel is distortable but three dimensionally stable, it is able to transmit pressure but is resistant to leakage from the bladder should the latter be punctured or ruptured.

BRIEF DESCRIPTION OF DRAWINGS

FIG. 2 illustrates a further embodiment of a sensor bag suitable for use in a smart airbag system.

FIG. 3 illustrates a cross-section through 3—3 of FIG. 2.

FIG. 4 illustrates a cross-section through 4—4 of FIG. 2.

BEST MODE FOR CARRYING OUT THE INVENTION

Figure 1A:
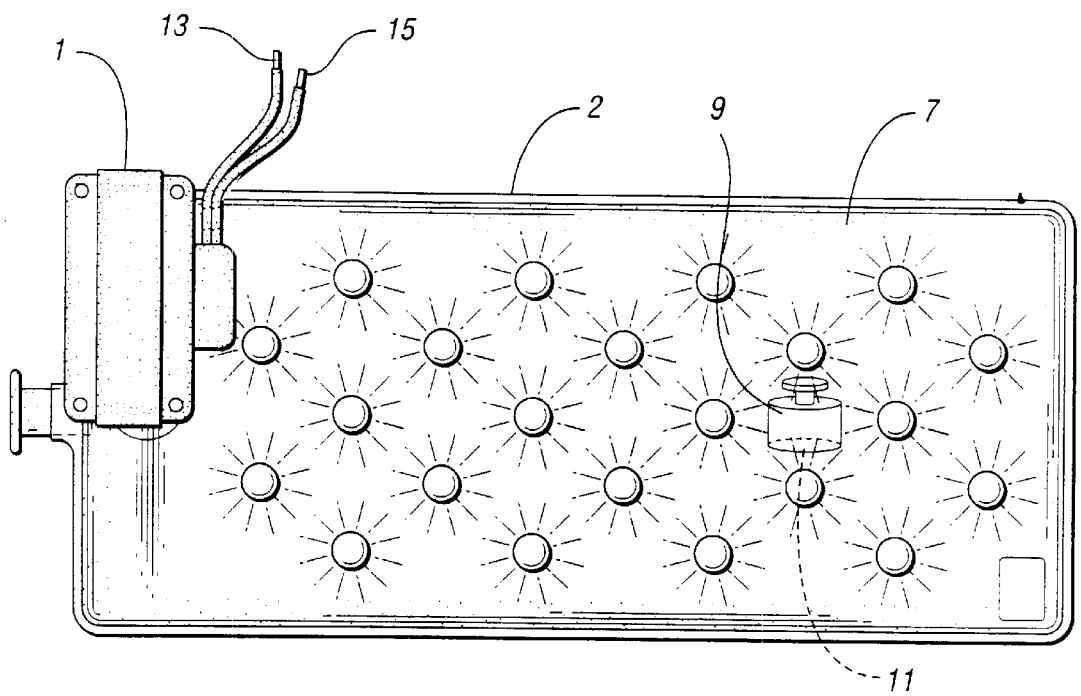
FIG. 1(a) illustrates a mock up of a smart airbag system employing an organopolysiloxane gel-filled sensor bag, viewed from the top.

The organopolysiloxane gels of the subject invention must be stable in the sense that they will not exhibit substantial liquid flow which would result in their gradual spreading over a large area, but instead, are relatively stable but deformable. The gels must exhibit sufficient "softness" or "deformability" that they are able to transmit pressure throughout the bladder to the pressure sensor, behaving in this aspect, like a fluid.

It has been surprisingly discovered that organopolysiloxane gels having a softness, expressed as a texture analysis value, of less than 40 g, will transmit hydrodynamic pressure within a bladder suitably, while not exhibiting liquid flow. The gels, when encased within a deformable bladder, will preferably not be substantially extruded as a strand from a bladder having a hole measuring 0.5 mm when a mass of 10 kg is placed onto the bladder and the hole is unobstructed. It is preferable that the gel possess both these physical properties.

Texture analysis value is a measure of gel consistency which is well known to those skilled in the art of organopolysiloxane gels. The texture analysis value of a gel is assessed by measuring the force required to inset a probe into a gel. The force is reported in mass units (g), which represents the maximum force required to push the probe 10 mm below the surface.

For the purposes of the subject invention, if the gel is too stiff, pressure will not be conducted uniformly through the gel. Rather, an anisotropic system will be created where the pressure transmitted to the pressure sensing device will vary greatly as the position of the occupant in the vehicle seat varies. Such systems would not reliably and reproducibly enable the system to detect the presence of an occupant having a weight greater than a selected cut-off value. On the other hand, if a viscous liquid instead of a gel is employed, it may be extruded from the bag if the latter is punctured, or in the case of a ruptured bag, may spread out into adjacent components rather than being maintained more or less intact in the locus occupied by the bag. Thus, the pressure transmission medium must be a gel. Suitable gels have a texture analysis value less than 40 g, preferably below 30 g, advantageously below 20 g, and most preferably below 10 g. At the same time, the gel is advantageously cohesive enough to resist substantial extrusion from a hole 0.5 mm in the bag when subjected to the pressure caused by a mass of 10 kg. Preferably, no extrusion will take place under these conditions from hole sizes of 1 mm, or larger. The term "substantial" means that no more than 10 to 20 g of gel will extrude under the above conditions over a period of two days. Of course, since the organopolysiloxane is a gel, any gel extruded from the bag will be maintained in the locus of the bag. In many such systems, temporary extrusion of the gel from a crack or puncture under pressure will be followed by the gel reentering the puncture when the pressure is removed.

The organopolysiloxane gels may be made by any convenient method known to those skilled in the art of organopolysiloxanes. The gels are generally crosslinked systems employing interactive organopolysiloxanes whose reactive functionalities exceed 2.0 on the average. For example, reactive organopolysiloxane systems may include addition crosslinkable systems containing organopolysiloxanes bearing unsaturated hydrocarbon groups such as vinyl, allyl, propenyl, hexenyl, vinylether, and the like, and an Si—H functional organopolysiloxane. Addition crosslinkable systems generally require a hydrosilylation catalyst for cure. Preferred hydrosilylation catalysts are platinum compounds, as are well known to those skilled in the art. Addition crosslinking may also be accomplished through use of Si—H functional organopolysiloxanes and other unsaturated compounds, e.g. alkenes, alkadienes, diacrylates, bisacrylamides, and the like. It is preferred that minimally 30 weight percent of crosslinkable species comprise organosiloxanes in order that temperature dependency of gel characteristics be minimized.

The gels may also be prepared from condensation crosslinkable systems. Such systems include organopolysiloxanes bearing halo, hydroxyl, alkoxy, acetoxy, and other condensable groups. Condensation catalysts such as the various organotin compounds may be used to facilitate condensation. Filled systems, such as those containing thickeners such as fumed silica and the like may also be useful. While polydimethylsiloxane-based gels may be preferred for economic reasons, polymethylphenylsiloxanes and similar siloxanes also containing benzyl or long chain alkyl groups may be preferable from a refinishing point of view.

The organosiloxy groups in the gel are not critical. Preferably, the majority of difunctional siloxy groups are dimethylsiloxy, diethylsiloxy, methylphenylsiloxy, and the like. In general, dialkyl, diaryl, and alkyl/aryl diorganosiloxane moieties are preferred. When a portion of the organo substituents are hydrophobic, i.e. benzyl, nonylphenyl, aralkyl, or long chain alkyl, and/or archydrocarbon moieties bearing groups such as —$NH_2$, —NHR, —$NR_2$, SH, and SR, where R is a hydrocarbon group, optionally containing heteroatoms, and preferably $C_{1-20}$ alkyl or $C_{6-20}$ aryl groups, the silicones, even if allowed beyond the locus of the seat cushion, may not significantly interfere with paintability.

The particular type of organopolysiloxane gel is not as important as the physical properties, i.e., the texture analysis value, the inability to be extruded from small openings at modest to low pressures, and the viscosity/temperature profile. Thus, substantially all organopolysiloxane gels having the necessary physical characteristics are useful. It has been found to be particularly expedient to employ a gel prepared from a substantial portion of non-reactive fluid, for example a polydimethylsiloxane fluid terminated with trimethylsilyl groups. In such compositions, less than 30% of reactive polymers may be used, preferably less than 20%, and most preferably in the range of 1—17%, these percents being percent by weight based on the total weight of the gel. Gels may, for example, be made by processes described in numerous patents, for example U.S. Pat. Nos. 5,654,362; 5,760,116; and 5,811,487, all herein incorporated by reference.

The degree of crosslinking in the gel may be adjusted to achieve the desired texture analysis value, viscosity/temperature relationship, and extrusion characteristics. Since the systems of the present invention are gels, the term "viscosity" may be somewhat misleading. In the sense used herein, "viscosity" and "viscosity/temperature profile" and similar terms refer to the texture analysis value and its change with temperature. It is desirable to have as little change in this value as possible, when the temperature varies from substantially below freezing (0° C.) to temperatures approaching 50° C. or higher.

It has been found that as the stiffness of the gel increases, its ability to transmit pressure becomes less isotropic. Particularly when the pressure sensor is located orthogonal to the pressure force vector, it will become increasingly difficult to differentiate between pressures generated by no or low mass, and higher mass. A gel has reached its "isotropic stiffness limit", measured by texture analysis value, when the output of the pressure sensor is incapable of differentiating between a no load condition and the pressure generated by a load of 1.5 kg located remote to the sensor. This isotropic stiffness limit must be met over a range of operating temperatures. A practical test involves measuring load/no load response differentials at sub-zero and ambient (close to standard) conditions, i.e., at −40° C. and +22° C. In general, gel stiffness decreases at significantly higher temperatures, and thus measurements at elevated temperatures are typically unnecessary. For example, gels with a texture analysis value of 30 g have been found to limit load/no load response differentials to a range of about 0.02–0.03 percent. For systems with gels of this or higher stiffness, it may be advisable to employ two or more sensors. Gels with a texture analysis value of about 40 g represent a stiffness which is marginal with single present day sensors. However, gels with this or a higher stiffness may be employed with multiple sensors, or with sensors of improved design. The true upper limit of stiffness is dictated by the inability to achieve a statistically reliable pressure (weight) differentiating signal between load/no load conditions, and not by any fixed stiffness value.

The sensors and sensor bags are entirely conventional, and are known to those skilled in art. Useful sensors may generate a pressure-dependent voltage, current, resistance, capacitance, inductance, frequency, digital output, or the like. The sensor per se and the electronics associated with their use form no part of the present invention. It is likely that dedicated, unique sensors will be developed by manufacturers when smart systems become commercial. A suitable sensor, employed in the present examples, is a MAP (manifold absolute pressure) sensor available from numerous manufacturers. This particular sensor used was a MAP for a 1987 Chevrolet Cavalier, which is apparently still used in current model cars. This MAP is a pressure sensitive disk which converts manifold pressure to a voltage signal. Other sensors, for example those used on some Ford Motor Company automobiles, generate a signal of varying frequency rather than varying voltage.

The sensor bag itself may be constructed of any flexible material which may be sealed to be resistant to leakage. Heat sealing, sealing with the aid of pressure sensitive adhesives, hot melt adhesives, contact adhesives, and the like may all be used to seal the gel within the bag. Screw type closures, etc., may also be useful. In the present examples, a curable silicone adhesive is used to seal the bag contents. However, in production, heat sealing would most likely be employed.

The bag material may be polyethylene, polypropylene, polyolefins in general, nylon, polyester, polyetherketone, polyethersulfone, polyurethane, or other flexible thermoplastic. The bag walls may be reinforced, for example, by using a bilayer, trilayer, or multilayer construction where one layer is a puncture resistant layer such as woven or non-woven fibers, e.g. fibreglass cloth, woven polypropylene, or non-woven polypropylene, e.g. Tyvek®. In the case of materials such as the latter, the very small maximum hole size in the non-woven (or woven for other materials) material may allow the entire construction to be of this material, since the small holes will not allow the gel to extrude. Sensor wires may be heat sealed through the filler opening or through side walls, by standard techniques.

In actual practice, the sensor bag is envisioned to be relatively flat with a discontinuous heat sealed pattern joining opposing faces to give strength yet allow pressure transfer over the entire surface. Air is preferably removed from the bag. When such bags are employed, it is commercially necessary that the fluid introduced have a flowable viscosity prior to cure to ensure complete filling without trapping air and without requiring excessive fill time.

Figure 1B:
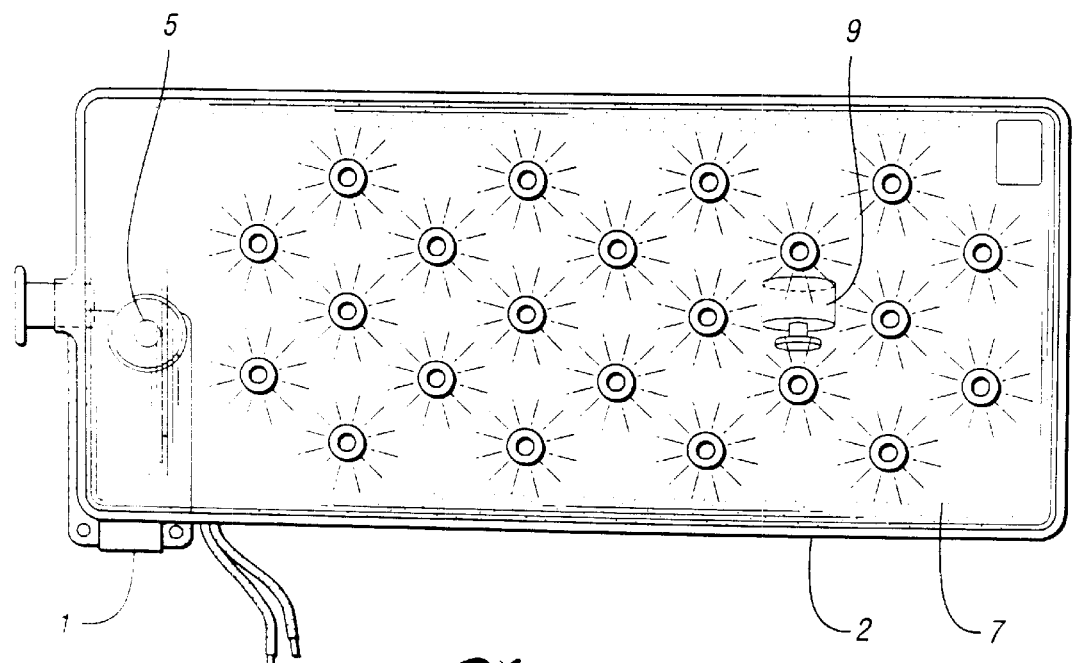
FIG. 1(b) illustrates a mock up of a smart airbag system employing an organopolysiloxane gel-filled sensor bag, viewed from the bottom.

While one skilled in the art will understand the subject invention without reference to drawings, FIGS. 1 and 2 serve to illustrate the system. In FIGS. 1(a) and 1(b), pressure sensor 1 communicates with the interior of sensor bag 2 through nipple 5. Both sensor bag 2 the passageway within nipple 5, and the interior of pressure sensor 1 are filled with organopolysiloxane gel 7. When pressure in the form of a mass 9 is placed on top of a portion 11 of the bag remote from sensor 1, the consistency of gel 7 must be such that pressure may be conducted through the gel to sensor 1 to elicit a reliable response. In this embodiment, electrical signal leads 13,15 are located external to the bag and thus need not be encapsulated. Signal leads 13,15 are connected to appropriate sensing circuitry, which forms no part of the present invention, and which can easily be fabricated by one skilled in the art.

FIG. 2 illustrates a preferred embodiment of the present invention, with all components of FIG. 1, labeled similarly. However, in FIG. 2, pressure sensor 1 has been replaced by an application specific sensor 6, located within the bag cavity. For example, sensor 6 might be only the active portion of sensor 1, less the associated nipple, and including only so much of a "housing" to render the sensor resistant to breakage. Signal leads 13,15 exit the bag trough sealed portion 1, which also has served, prior to sealing, as a fill port for the uncured organopolysiloxane gel. The bag in FIG. 2 has been crimped, or heat sealed at locations 19 to provide a more planar, somewhat more stable, and more breakage resistant bag. At locations 19, the top has been sealed to the bottom. The sealing locations 19 may be in the form of a regular array, a random array, channels, etc., as long as the ability of the gel to transmit pressure through the bag is not compromised.

FIG. 3 is a cross-section across 3—3 of FIG. 2, showing the locations of the (preferably) heat sealed "crimps" which create dimples in the device. These take the place of the pop rivets in FIG. 1.

FIG. 4 is a cross-section of FIG. 2 across 4—4 and illustrate the placement of the sensor and lead 15 exiting through the heat sealed periphery 17.

Having generally described this invention, a further understanding can be obtained by reference to certain specific examples which are provided herein for purposes of illustration only and are not intended to be limiting unless otherwise specified.

EXAMPLES 1 AND 2 AND COMPARATIVE EXAMPLE C1

Experimental sensor bags were prepared using standard hospital IV bags (flexible bags for intravenous administration of fluids). A MAP sensor (Chevrolet Cavalier, 1987) was fitted to the bag at one end, and 120 g of test pressure transmission medium added. Prior to adding the test fluid or gel, the bag internal volume was adjusted to ca. 120 ml by using pop rivets. In the envisioned commercial embodiment, the bag would, of course, be manufactured directly to the desired size. After the fluid is added the bags are sealed with a silicone sealant, SWS-951 sealant available from Wacker Silicones, Adrian, Mich. The sensors are biased at 5 v DC and the sensor output signal voltage measured at no load at −40° C. and +22° C., and at the same temperatures with a 1.5 kg mass placed on the bag at the end furthest from the sensor. The bags were tested in the flat (horizontal) position. The three test pressure transmission mediums were the following:

Comparative Example 1

A 1000 cP polydimethylsiloxane fluid, trimethylsilyl terminated.

Example 1

A gel having a texture analysis value of 3.3 g, prepared by adding 8.5% of vinyldimethylsilyl-terminated organopolysiloxane fluid having a viscosity of 20,000 cP; 2% of an Si—H functional, polydimethylsiloxane fluid crosslinker containing 0.06 weight percent silicon-bonded H atoms; and 0.05% of a platinum hydrosilylation catalyst, to 89.45% of a 100 cP trimethylsilyl-terminated polydimethylsiloxane fluid. Following introduction into the IV bag, the composition cured to a gel at room temperature after 6 hours. Texture analysis was measured using a TA.XT2 Texture Analyzer from Texture Technologies, Scarsdale, N.Y., fitted with a 0.5 inch (12.5 mm) half-spherical probe number TA23. The hardness of the gel is expressed as the peak force (g) required to push the probe 10 mm below the surface of the gel.

Example 2

A soft organopolysiloxane gel having greater stiffness than that of Example 1, as demonstrated by a penetration of 200 mm/10 g and a texture analysis value of 30.

The results of testing the ability of the pressure transmission media are summarized by Table 1.

| Pressure Transmission | Signal At 22° C. | | | Signal At −40° C. | | |
|---|---|---|---|---|---|---|
| Medium | No-Load | 1.5 Kg Load | Difference | No-Load | 1.5 Kg Load | Difference |
| Comparative Example 1 | 4.845 v | 4.897v | 1.07% | 4.635 v | 4.691 v | 1.21% |
| Example 1 | 4.900 v | 4.938 | 0.78% | 4.482 v | 4.545 v | 1.41% |
| Example 2 | 4.764 v | 4.765v | 0.02% | 3.800 v | 3.801 v | 0.03% |

The results demonstrate that organopolysiloxane gels may be used as pressure transmission media. The soft gel of Example 1 was as effective overall in transmitting pressure as the silicone fluid. The stiffer gel was not as effective with the particular bag/sensor employed, but did demonstrate measurable pressure transmission.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. In a smart airbag system employing a weight-sensitive pressure detection device comprising a pressure sensor associated with a bag containing a pressure transmission medium, the improvement comprising employing as said pressure transmission medium an organopolysiloxane gel having a stiffness which allows said smart airbag system to differentiate between a no-load condition and a loaded condition caused by a 1.5 Kg mass bearing on said bag remote from said sensor.

2. The smart airbag system of claim 1 wherein said organopolysiloxane gel has a stiffness expressed as texture analysis value of less than 40 g.

3. The smart airbag system of claim 1 wherein said organopolysiloxane gel has a stiffness such that said gel does not substantially extrude from a 0.5 mm hole in said bag subjected to pressure generated by a mass of 10 kg.

4. The smart airbag system of claim 2 wherein said organopolysiloxane gel has a stiffness such that said gel does not substantially extrude from a 0.5 mm hole in said bag subjected to pressure generated by a mass of 10 kg.

5. The smart airbag system of claim 1 wherein said organopolysiloxane gel has a stiffness expressed as texture analysis value of less than 20 g.

6. The smart airbag system of claim 2, wherein said organopolysiloxane gel has a stiffness expressed as texture analysis value of less than 10 g.

7. The smart airbag system of claim 3, wherein said organopolysiloxane gel has a stiffness expressed as texture analysis value of less than 10 g.

8. A sensor bag suitable for monitoring pressure, said sensor bag comprising a flexible bag containing a organopolysiloxane gel as a pressure transmission medium, and a pressure sensing device contained in said bag or outside of said bag and communication with said gel, said pressure sensing device responsive to pressure transmitted to said sensor through said pressure transmission medium.

9. A sensor bag of claim 8 wherein said organopolysiloxane gel has a stiffness expressed as a texture analysis value of less than 40 g.

10. A sensor bag of claim 8 wherein said organopolysiloxane gel has a stiffness expressed as a texture analysis value of less than 20 g.

11. A sensor bag of claim 8 wherein said organopolysiloxane gel has a stiffness expressed as a texture analysis value of less than 10 g.

12. The sensor bag of claim 8 wherein said gel has a stiffness such that said gel does not substantially extrude from an unobstructed 0.5 mm diameter hole in said bag under the pressure generated by a 10 kg mass resting on said bag.

13. The sensor bag of claim 9 wherein said gel has a stiffness such that said gel does not substantially extrude from an unobstructed 0.5 mm diameter hole in said bag under the pressure generated by a 10 kg mass resting on said bag.

14. The sensor bag of claim 10 wherein said gel has a stiffness such that said gel does not substantially extrude from an unobstructed 0.5 mm diameter hole in said bag under the pressure generated by a 10 kg mass resting on said bag.

15. The sensor bag of claim 8 wherein said gel has a stiffness such that said gel does not substantially extrude from an unobstructed 1.0 mm diameter hole in said bag under the pressure generated by a 10 kg mass resting on said bag.

16. The sensor bag of claim 9 wherein said gel has a stiffness such that said gel does not extrude from an unobstructed 1.0 mm diameter hole in said bag under the pressure generated by a 10 kg mass resting on said bag.

17. The sensor bag of claim 8, wherein said organopolysiloxane gel comprises an addition-crosslinked gel.

18. The sensor bag of claim 8, wherein said organopolysiloxane gel comprises an condensation-crosslinked gel.

19. The sensor bag of claim 8 wherein said organopolysiloxane gel comprises 60 weight percent or more of a non-functional polydiorganosiloxane.

20. The sensor bag of claim 19, wherein said organopolysiloxane gel comprises 80 weight percent or more of a non-functional organopolysiloxane, and from 1 weight percent to about 20 weight percent of crosslinked organosilicon compounds.

* * * * *